United States Patent [19]

Hayano et al.

[11] Patent Number: 5,838,311
[45] Date of Patent: Nov. 17, 1998

[54] METHOD OF SAMPLING COLOR SIGNAL

[75] Inventors: Shiro Hayano; Masamitsu Toda; Kazuyoshi Nishiyama, all of Osaka, Japan

[73] Assignee: Contec Co., Ltd., Osaka, Japan

[21] Appl. No.: 609,544

[22] Filed: Mar. 1, 1996

[30] Foreign Application Priority Data

Mar. 6, 1995 [JP] Japan ..................... 7-45452

[51] Int. Cl.$^6$ ............................. G09G 5/04
[52] U.S. Cl. ................ 345/213; 345/153; 348/539; 348/540
[58] Field of Search ............... 331/20, 25, 17; 327/156–160; 348/537, 539, 540, 546, 542–544, 548, 549; 345/204, 213, 153, 431

[56] References Cited

U.S. PATENT DOCUMENTS

| 4,360,788 | 11/1982 | Erps et al. | 331/25 |
| 4,905,085 | 2/1990 | Faulhaber | 348/537 |
| 4,922,343 | 5/1990 | Ardo | 348/537 |
| 4,985,757 | 1/1991 | Yasuki et al. | 348/549 |
| 5,124,671 | 6/1992 | Srivastava | 331/20 |
| 5,459,435 | 10/1995 | Taki | 327/160 |

*Primary Examiner*—Lun-Yi Lao
*Attorney, Agent, or Firm*—Oblon, Spivak, McClelland, Maier & Neustadt, P.C.

[57] ABSTRACT

Receiving an instruction designating a frequency f by an MPU (1), a programmable clock generator (2) generates a dot clock D which has the frequency f. The dot clock D and a horizontal synchronizing signal H having a cycle $T_H$ are supplied to a counter (3). The counter (3) counts the number N of activations of the dot clock D during the cycle $T_H$. The activation number N is supplied to a comparator (4), together with a predetermined number K which is designated by the MPU (1). The comparator (4) compares these numbers and supplies a comparison result C to the MPU (1). The MPU (1) updates the frequency f, in accordance with the comparison result C.

7 Claims, 10 Drawing Sheets

METHOD OF SAMPLING COLOR SIGNAL

BACKGROUND OF THE INVENTION

1. Field of the Invention

The present invention relates to a technique for displaying based on a display signal, and more particularly, to technique for automatically optimizing sampling of a color signal.

2. Description of the Background Art

There are a plurality of types of display apparatuses, such as CRTs and flat displays, which are connected to personal computers. Such a display apparatus displays based on a display signal which is supplied from a personal computer.

In addition to a synchronizing signal such as a horizontal synchronizing signal, a display signal includes signals, such as a color signal, which designate attributes of display at a specified position. Attributes are not displayed as a color in a monochrome display apparatus. Instead, attributes are displayed as a varying density (i.e., a gradation).

Of these signals, a color signal is generally supplied to a display apparatus, as an RGB signal having an analog state. A CRT displays a color based on such an RGB signal.

On the other hand, there are some flat displays, such as a plasma display apparatus and a liquid crystal display, apparatus which cannot deal with an analog RGB signal. Such display apparatuses perform AID conversion on an RGB signal by sampling so as to display a color (or a gradation). Sampling is performed in accordance with a signal called "dot clock" which is periodically activated.

In general, unlike a displace signal, a dot clock is not available from a personal computer. Hence, a display apparatus generates a dot clock to perform However, even if a personal computer itself is compatible with IBM PC/AT, for instance, VGA video systems of the two computers may have different horizontal synchronizing signals, etc.

Therefore, if the phase and the frequency of a dot clock are fixed within a display apparatus, depending on a compatible apparatus which is connected to the display apparatus, undesirable results such as color shifting called "dot shifting" and running of colors are created. To avoid this, it is necessary to adjust the phase and the frequency of the dot clock and to perform proper sampling.

The phase of the dot clock can be adjusted relatively easily, by manipulating dip switches while observing a display. However, it is very difficult to manually adjust the frequency of the dot clock by manipulating the dip switches or the like.

SUMMARY OF THE INVENTION

The present invention relates to a color signal sampling method for sampling a color signal of an analog form, which uses a sampling clock having a frequency f, the color signal sampling method comprising the steps of: (a) inputting a horizontal synchronizing signal which is activated during a predetermined cycle $T_H$ and inputting the color signal; (b) counting the number N of activations of the sampling clock per the cycle $T_H$; (c) comparing the number N of activations with a predetermined number K; (d) setting the frequency f to a frequency $f_0$ by performing (d-1) first processing for decreasing the frequency f when N>K; and (d-2) second processing for increasing the frequency f when N<K; and (e) sampling the color signal using the sampling clock at the frequency $f_0$.

Preferably, the frequency f is controlled in a unit which is finer than $1/T_H$, and the first processing includes the steps of: (d-1-1) decreasing the frequency f by the unit and setting the frequency f immediately before N=K as a first frequency $f_1$; (d-1-2) decreasing the frequency f by the unit and setting the frequency f which sets N=K−1 for first time as a second frequency $f_2$; and (d-1-3) calculating the frequency $f_0$ by $(f_1+f_2)/2$.

Preferably, the second processing includes the steps of: (d-2-1) increasing the frequency f by the unit and setting the frequency f as it is immediately before N=K as a third frequency $f_3$; (d-2-2) increasing the frequency f by the unit and setting the frequency f which sets N=K+1 for first time as a fourth frequency $f_4$; and (d-2-3) calculating the frequency $f_0$ by $(f_3+f_4)/2$.

Preferably, the step (d) includes the steps of: (d-3) when N=K, (d-3-1) increasing the frequency f by the unit and setting the frequency f which sets N=K+1 for first time as a fifth frequency $f_5$; (d-3-2) decreasing the frequency f by the unit and setting the frequency f which sets N=K−1 for first time as a sixth frequency $f_6$; and (d-3-3) calculating the frequency $f_0$ by $(f_5+f_6)/2$.

As herein termed, "color" refers to a concept which includes a gradation in monochrome displaying In the color signal sampling method according to a first aspect of the invention, the frequency f of the sampling clock which samples the color signal is lowered when the number N of activations during the predetermined cycle $T_H$ is larger than the predetermined number K, but the frequency f of the sampling clock which samples the color signal is increased when the number N of activations during the predetermined cycle $T_H$ is smaller than the predetermined number K.

In the color signal sampling method according to a second aspect of the invention, when the number N of activations during the predetermined cycle $T_H$ is larger than the predetermined number K, the smallest frequency of the sampling clock with which the number N of activations is larger than the predetermined number K only by 1 is defined as the first frequency $f_1$ and the largest frequency of the sampling clock with which the number N of activations is smaller than the predetermined number K only by 1 is defined as the second frequency $f_2$. As the frequency $f_0$ which is optimum for sampling, an average value of the first frequency $f_1$ and the second frequency $f_2$ is used.

In the color signal sampling method according to a third aspect of the invention, when the number N of activations during the predetermined cycle $T_H$ is smaller than the predetermined number K, the largest frequency of the sampling clock with which the number N of activations is smaller than the predetermined number K only by 1 is defined as the third frequency $f_3$ and the smallest frequency of the sampling clock with which the number N of activations is larger than the predetermined number K only by 1 is defined as the fourth frequency $f_4$. As the frequency $f_0$ which is optimum for sampling, an average value of the third frequency $f_3$ and the fourth frequency $f_4$ is used.

In the color signal sampling method according to a fourth aspect of the invention, when the number N of activations during the predetermined cycle $T_H$ is equal to the predetermined number K, the smallest frequency of the sampling clock with which the number N of activations is larger than the predetermined number K only by 1 is defined as the fifth frequency $f_5$ and the largest frequency of the sampling clock with which the number N of activations is smaller than the predetermined number K only by 1 is defined as the sixth frequency $f_6$. As the frequency $f_0$ which is optimum for sampling, an average value of the fifth frequency $f_5$ and the sixth frequency $f_6$ is used.

In the color signal sampling method according to the first aspect of the invention, since the frequency f of the sampling clock is automatically controlled so that the number N of activations during the predetermined cycle $T_H$ becomes close to the predetermined number K, sampling of the color signal is automatically optimized.

In the color signal sampling method according to the second aspect of the invention, when the number N of activations during the predetermined cycle $T_H$ is larger than the predetermined number K, it is possible to set the frequency f of the sampling clock around the center of frequencies at which the number N of activations is equal to the predetermined number K.

In the color signal sampling method according to the third aspect of the invention, when the number N of activations during the predetermined cycle $T_H$ is smaller than the predetermined number K, it is possible to set the frequency f of the sampling clock around the center of frequencies at which the number N of activations is equal to the predetermined number K.

In the color signal sampling method according to the fourth aspect of the invention, when the number N of activations during the predetermined cycle $T_H$ is equal to the predetermined number K, it is possible to set the frequency f of the sampling clock around the center of frequencies at which the number N of activations is equal to the predetermined number K.

Accordingly, an object of the present invention is to provide for a technique for automatically optimizing sampling of a color signal These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
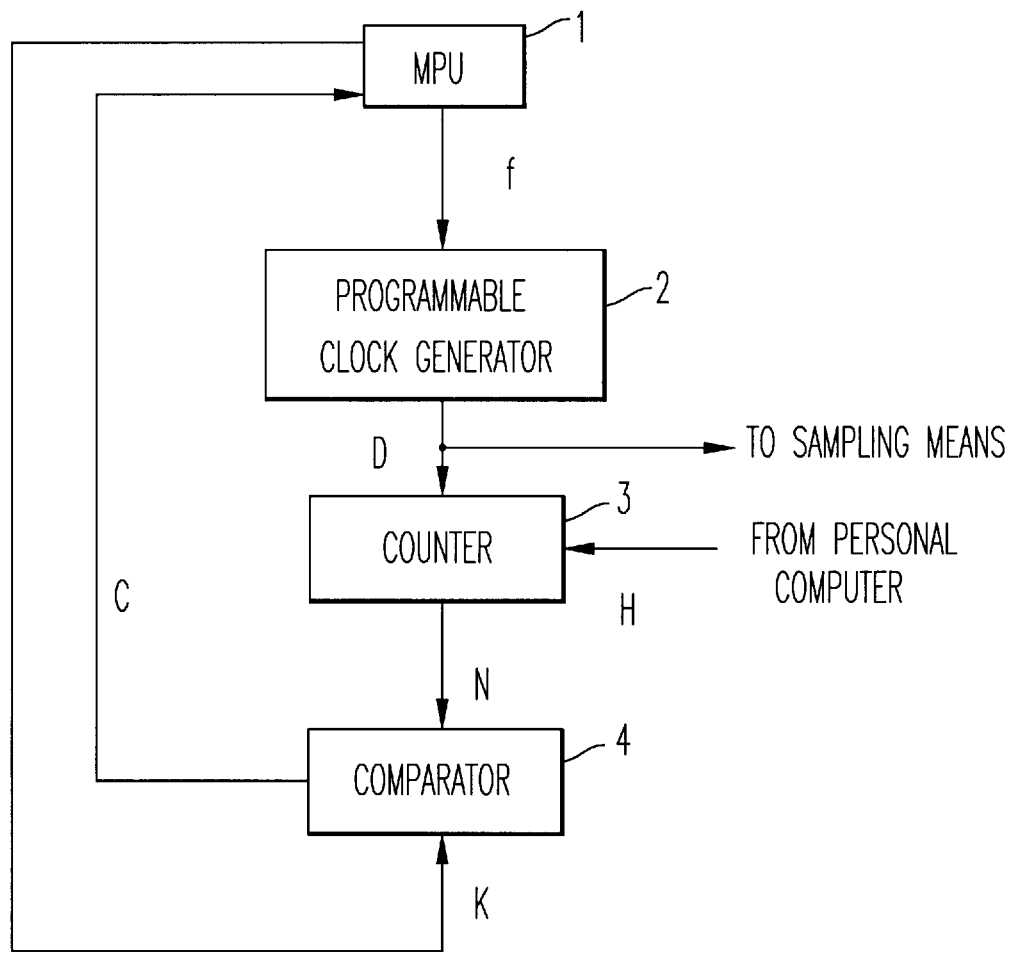
FIG. 1 is a block diagram showing a structure according to a preferred embodiment of the present invention.

FIG. 1 is a block diagram showing a structure according to a preferred embodiment of the present invention. A display apparatus comprises an MPU 1, a programmable clock generator 2, a counter 3., and a comparator 4.

Receiving an instruction designating a frequency f by the MPU 1, the programmable clock generator 2 generates a dot clock D which has the frequency f. The dot clock D, which is used for sampling of a color signal, is supplied to sampling means not shown which is separately disposed in the display apparatus.

Meanwhile, the dot clock D is also supplied to the counter 3. The counter 3 also receives a horizontal synchronizing signal H having a cycle $T_H$, from a personal computer not shown. During the cycle $T_H$, the counter 3 counts the number N of activations of the dot clock D.

The activation number N is supplied to the comparator 4, together with a predetermined number K which is designated by the MPU 1. The comparator 4 compares these numbers and supplies a comparison result C to the MPU 1.

The activation number N of the dot clock D per the cycle $T_H$ of the horizontal synchronizing signal H is 800, regardless of the type of the apparatus.

For instance, in a 640×480 graphic mode for a VGA video system. 640 dots of 800 dots are displayed in a horizontal direction. Thus, when the activation number N of the dot clock D per the cycle $T_H$ is 800, it is possible to appropriately sample a color signal. However, a fact that easy adjustment of the frequency of the dot clock D is impossible while the cycle $T_H$ is different between video systems of various compatible machines is the very cause of the conventional problems.

Figure 2:
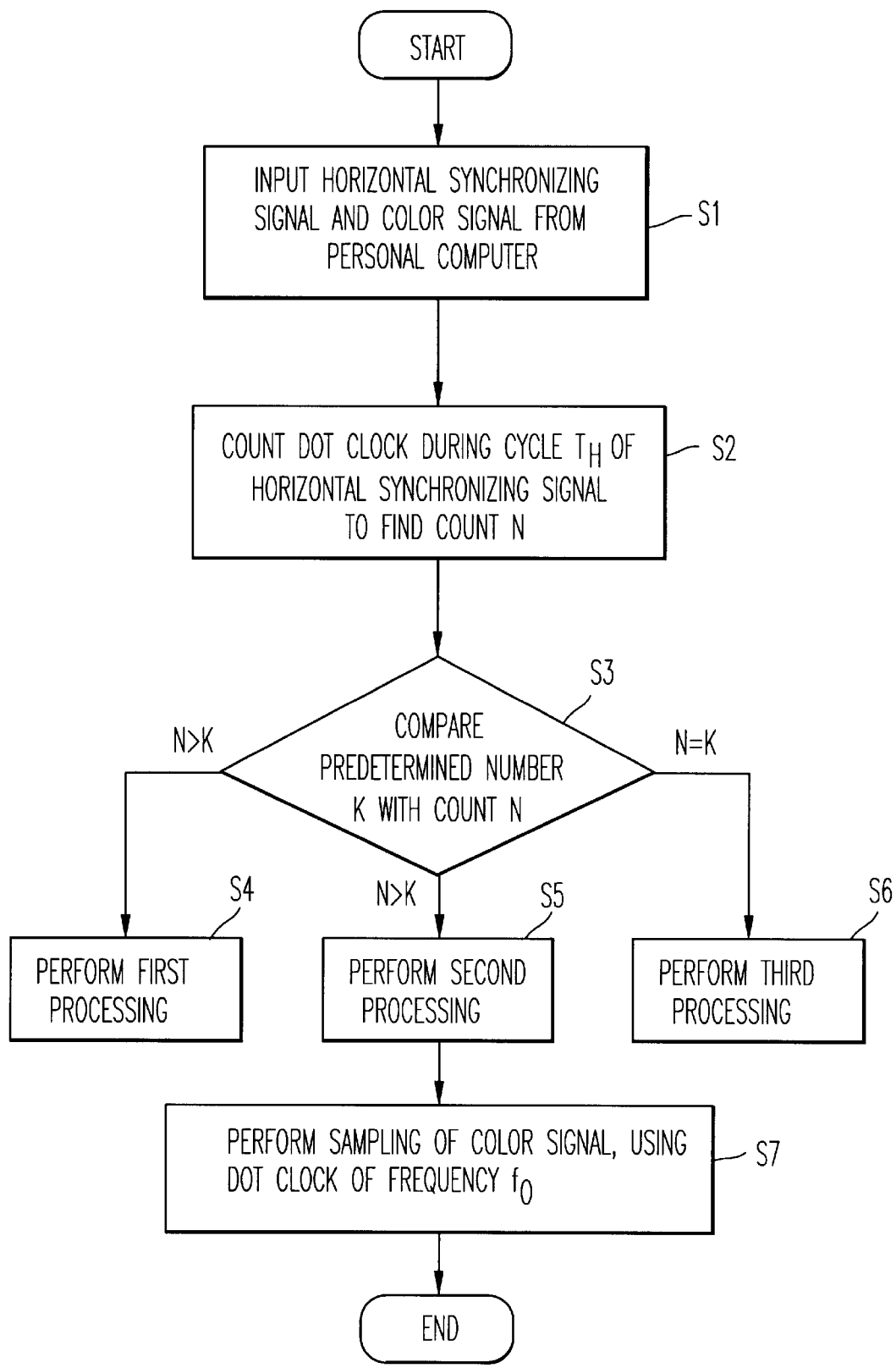
FIG. 2 is a flow chart showing an operation according to the preferred embodiment of the present invention.

FIG. 2 is a flow chart showing an operation according to the preferred embodiment At Step S1, the horizontal synchronizing signal H and a color signal are supplied from the personal computer. The inputted color signal is supplied to the sampling means, while the horizontal synchronizing signal H is supplied to the counter 3. At Step S2, the counter 3 counts the dot clock D during the cycle $T_H$ of the horizontal synchronizing signal H and outputs the count N.

Figure 3:
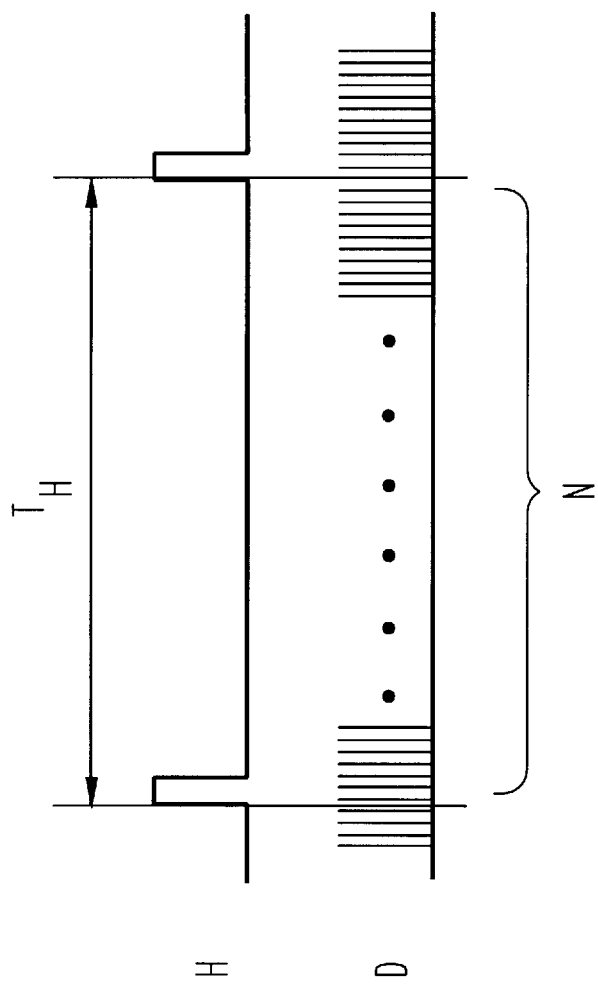
FIG. 3 is a waveform diagram showing the operation according to the preferred embodiment of the present invention.

FIG. 3 is a waveform diagram showing a relationship between the horizontal synchronizing signal H and the dot clock D. The dot clock D is activated N times during the cycle $T_H$.

At Step S3, the comparator 4 compares the predetermined number K with the count N. A number expressing the number of activations during the cycle $T_H$, which is desirable for proper sampling of the color signal, i.e., 800 is selected as the predetermined number K.

Figure 4:
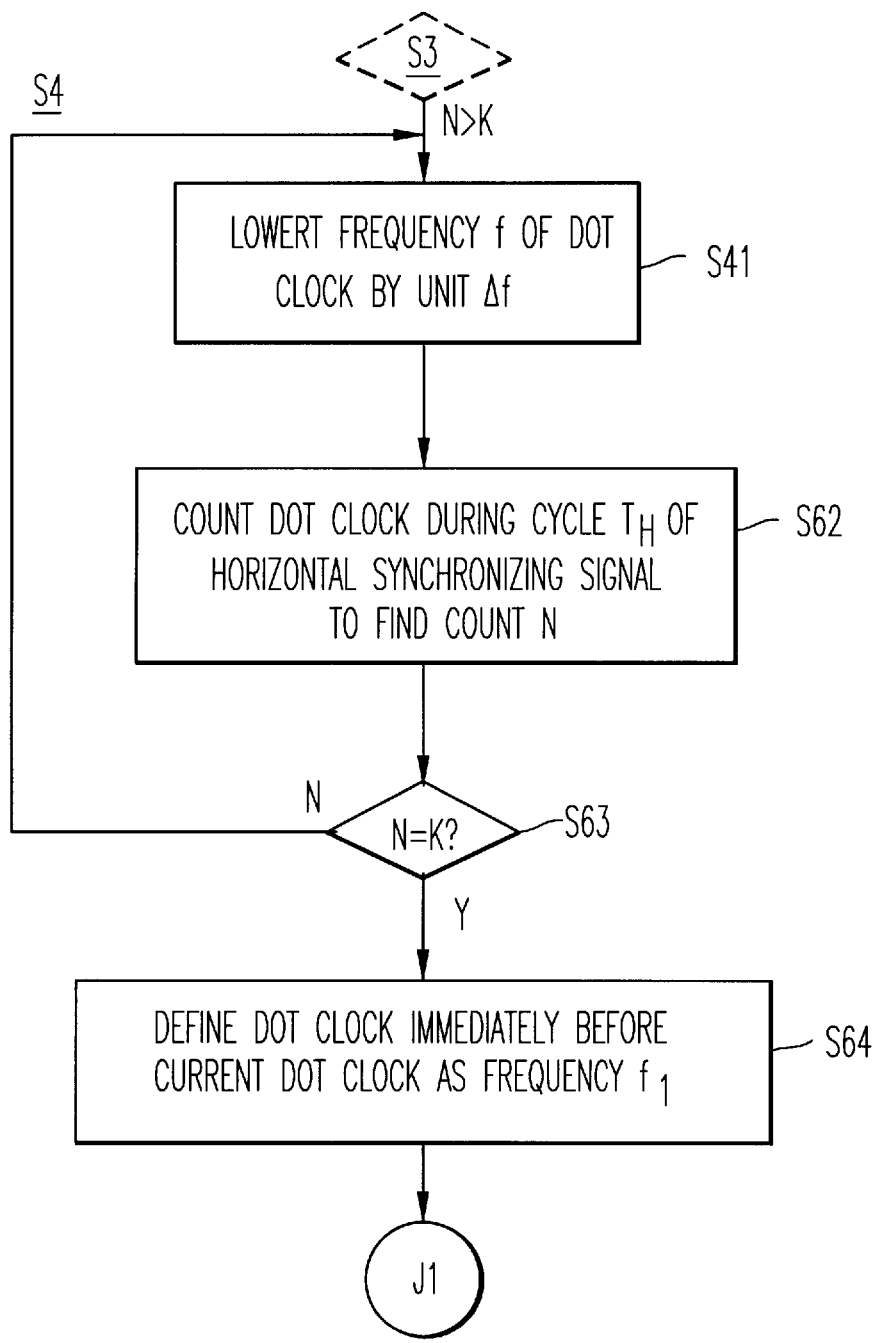
FIG. 4 is a flow chart which shows, as it is combined with FIG. 5, the details of a portion of the flow chart shown in FIG. 2.
Figure 5:
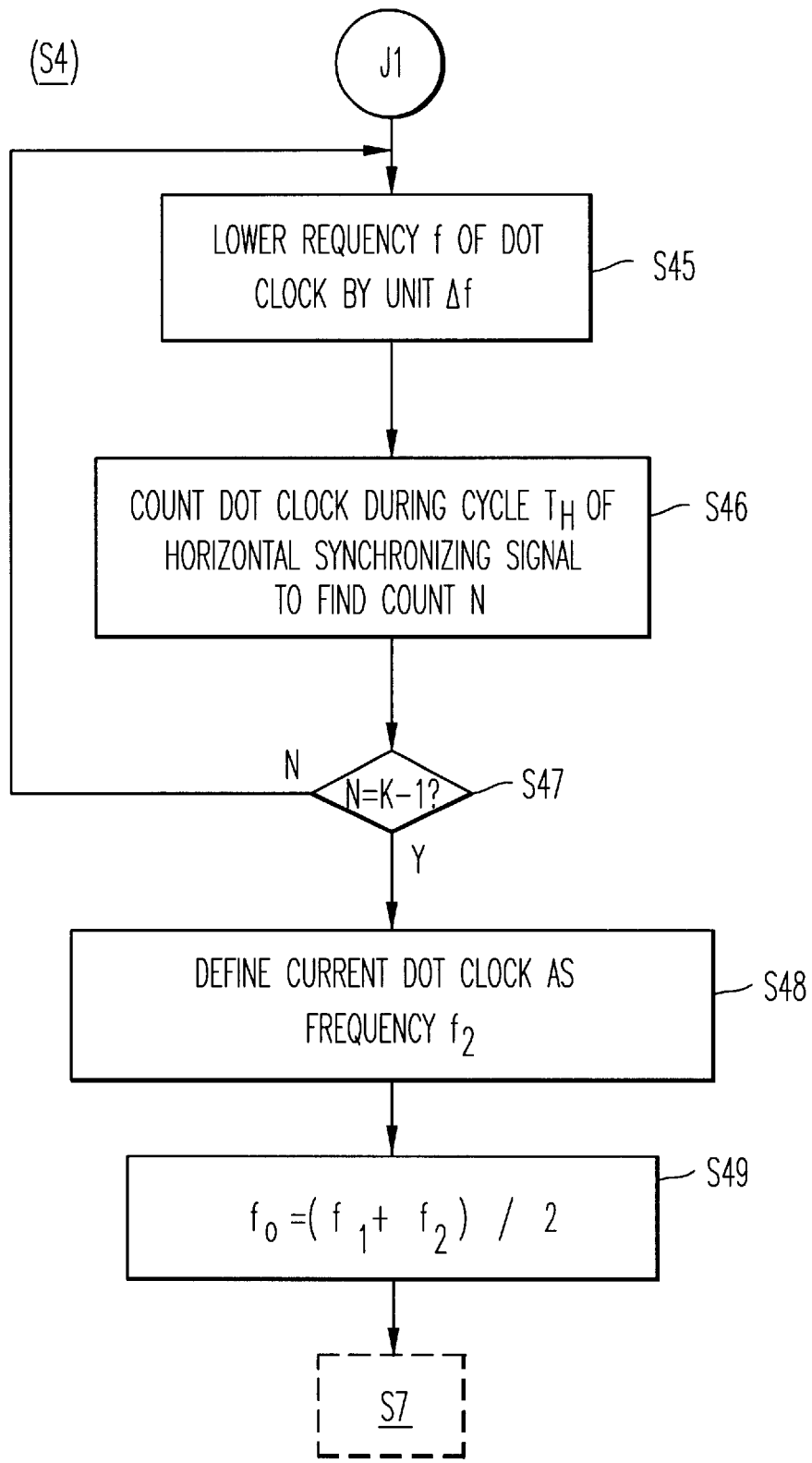
FIG. 5 is a flow chart which shows, as it is combined with FIG. 4, the details of a portion of the flow chart shown in FIG. 2.

At Step S3, the sequence divides into three types of processing depending on the comparison result C which is supplied to the MPU 1. That is, when the count N is larger than the predetermined number K, the sequence proceeds to Step S4 to perform first processing. When the count N is smaller than the predetermined number K, the sequence proceeds to Step S5 to perform second processing. When the count N is equal to the predetermined number K, the sequence proceeds to Step S6 to perform third processing (a) First Processing:

FIGS. 4 and 5 are flow charts which show, as they are combined together, the details of Step S4 of FIG. 1. The two flow charts are successive to each other at J1.

As shown in FIG. 4, at Step S41, the frequency f of the dot clock D is lowered by a unit Δf. This is attained by controlling the designation of the frequency f which is supplied to the programmable clock generator 2 by the MPU 1. The unit Δf is a minimum unit by which the frequency f is controlled by the programmable clock generator 2. A condition which the unit Δf must satisfy will be described later.

Next, at Step S42, the count N is found. Since the frequency f of the dot clock D is lowered, the count N will become equal to the predetermined number K in a due course. Until the count N becomes equal to the predetermined number K, the sequence returns to Step S41 through Step S43 to continue lowering of the frequency f.

If it is judged that the count N is equal to the predetermined number K at Step S43, the sequence proceeds to Step S44 to define the frequency of the dot clock D as it is immediately before the current frequency of the dot clock D as a first frequency $f_1$.

TABLE 1

| Count Number N | Frequency f |
| --- | --- |
| . | . |
| . | . |
| . | . |
| 801 | $f_u$ |
| 801 | $f_u - \Delta f$ |
| 801 | $f_u - 2\Delta f$ |
| 801 | $f_u - 2\Delta f = f_1$ |
| 800 | $f_u - 4\Delta f$ |
| . | . |
| . | . |
| . | . |
| 800 | $f_u - m\Delta f$ |
| 800 | $f_u - (m + 1)\Delta f$ |
| 800 | $f_u - (m + 2)\Delta f$ |
| 799 | $f_u - (m + 3)\Delta f = f_2$ |
| 799 | $f_u - (m + 4)\Delta f$ |
| 799 | $f_u - (m + 5)\Delta f$ |
| . | . |
| . | . |
| . | . |

Table 1 shows how the count N corresponds to the frequency f, during the first processing from Step S2 through Step S4. First, if the count N of the dot clock D having a frequency $f_u$, is 801. the sequence proceeds to Step S41 through Step S3 so that the frequency f of the dot clock D is $f_u - \Delta f$. Next, the sequence proceeds to Step S42, and if the count is still 801, the sequence returns to Step S41 via Step S43, whereby the frequency f is $f_u - 2\Delta f$.

Step S41 for lowering the frequency f is repeated in this manner, and when the count N becomes 800 for the first time at Step S42 with the frequency f satisfying $f_u - 4\Delta f$, the sequence proceeds to Step S44 via Step S43. Instead of the current frequency $f_u - 4\Delta f$ of the dot clock D, the immediately precedent frequency $f_u - 3\Delta f$ is set as the first frequency $f_1$.

As can be understood from the above, the first frequency $f_1$ which is found at Step S44 is the smallest one so that the count N is 801 which exceeds the predetermined number only by 1.

Next, as shown in FIG. 5, the frequency f of the dot clock D is lowered by the unit Δf at Step S45, as at Step S41. Following this, at Step S46, the count N is found as at Step S42. Since the frequency f of the dot clock D is further lowered from the state where the count N became equal to the predetermined number K at Step S43, the count N will become smaller than the predetermined number K by 1 in a due course. Until the count N becomes smaller than the predetermined number K by 1, the sequence returns to Step S45 through Step S47 to continue lowering of the frequency f.

If it is judged that the count N is smaller than the predetermined number K by 1 at Step S47, the sequence proceeds to Step S48 to define the current frequency of the dot clock D as a second frequency $f_2$.

The operation from Step S45 to Step S48 will be described with reference to Table 1. The frequency f of the dot clock D is lowered at Step S45, and the sequence proceeds to Step S46. If the count is still 800 at Step S46, the sequence returns to Step S45 via Step S47, whereby the frequency f is further lowered.

Step S45 is repeated in this manner. When the count N become 799 for the first time at Step S46 with the frequency f satisfying $f_u - (m + 3) \Delta f$, the sequence proceeds to Step S48 via Step S47 to define the current frequency $f_u - (m+3)$ of the dot clock D as the second frequency $f_2$.

As can be understood from the above, the second frequency $f_2$ which is found at Step S48 is the largest one so that the count N is 799 which is smaller than the predetermined number only by 1.

A frequency $f_0$ which is calculated by $(f_1 + f_2)/2$ is set at Step S49, and the sequence proceeds to Step S7 which is shown in FIG. 2. The frequency f, which is set in this manner is around the center among frequencies at which the count N becomes 800.

Since the frequency $f_0$ which is optimum for sampling is calculated, at Step S7, sampling of the color signal is performed using the dot clock D which has the frequency $f_0$.

Thus, when the count N is larger than the predetermined number K, using the dot clock D which has the frequency $f_0$ which is optimum for sampling, optimum sampling of the color signal is performed.

The frequency f must be controlled sufficiently fine That is, the unit Δf must be sufficiently small. Otherwise, the sequence skips to Step S41 from Step S3 from the beginning to lower the frequency by the unit Δf, so that the count may become K−1, rather than K, at Step S42. If this occurs, Step S41 and Step S42 will be repeated without satisfying the condition which is defined at Step S43.

Hence, even if the count N which is found at Step S2 is larger than the predetermined number K by 1 and the frequency f of the dot clock D is the smallest in such a state, the count N of the dot clock D having a frequency which is lower than this by the unit Δf must be equal to or larger than the predetermined number K To have this condition satisfied, the count N must not become different by 2 or more during the cycle $T_H$, depending on a variation in the unit Δf. That is, the unit Δf must be smaller than $1/T_H$.

Figure 6:
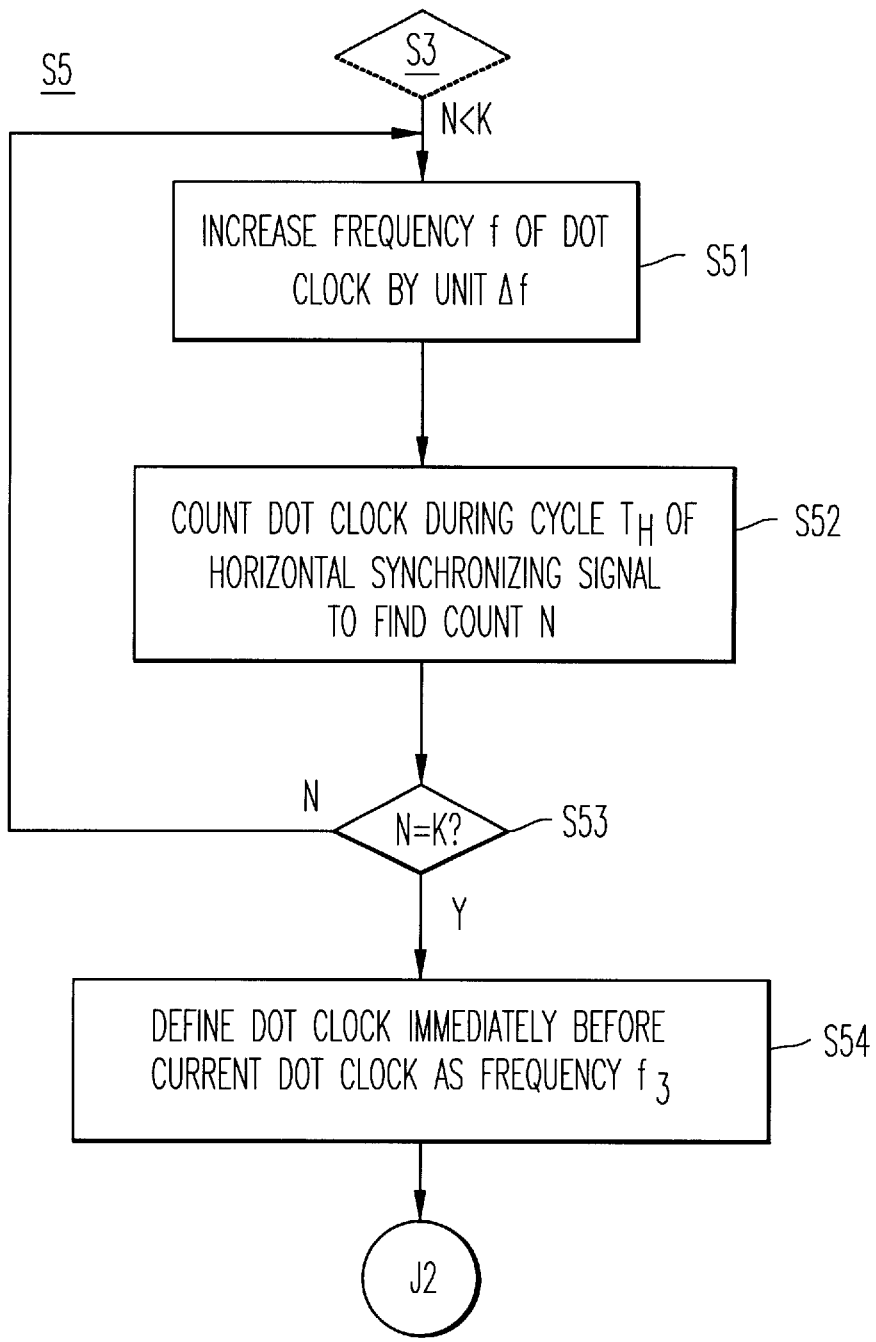
FIG. 6 is a flow chart which shows, as it is combined with FIG. 7, the details of a portion of t he flow chart shown in FIG. 2.
Figure 7:
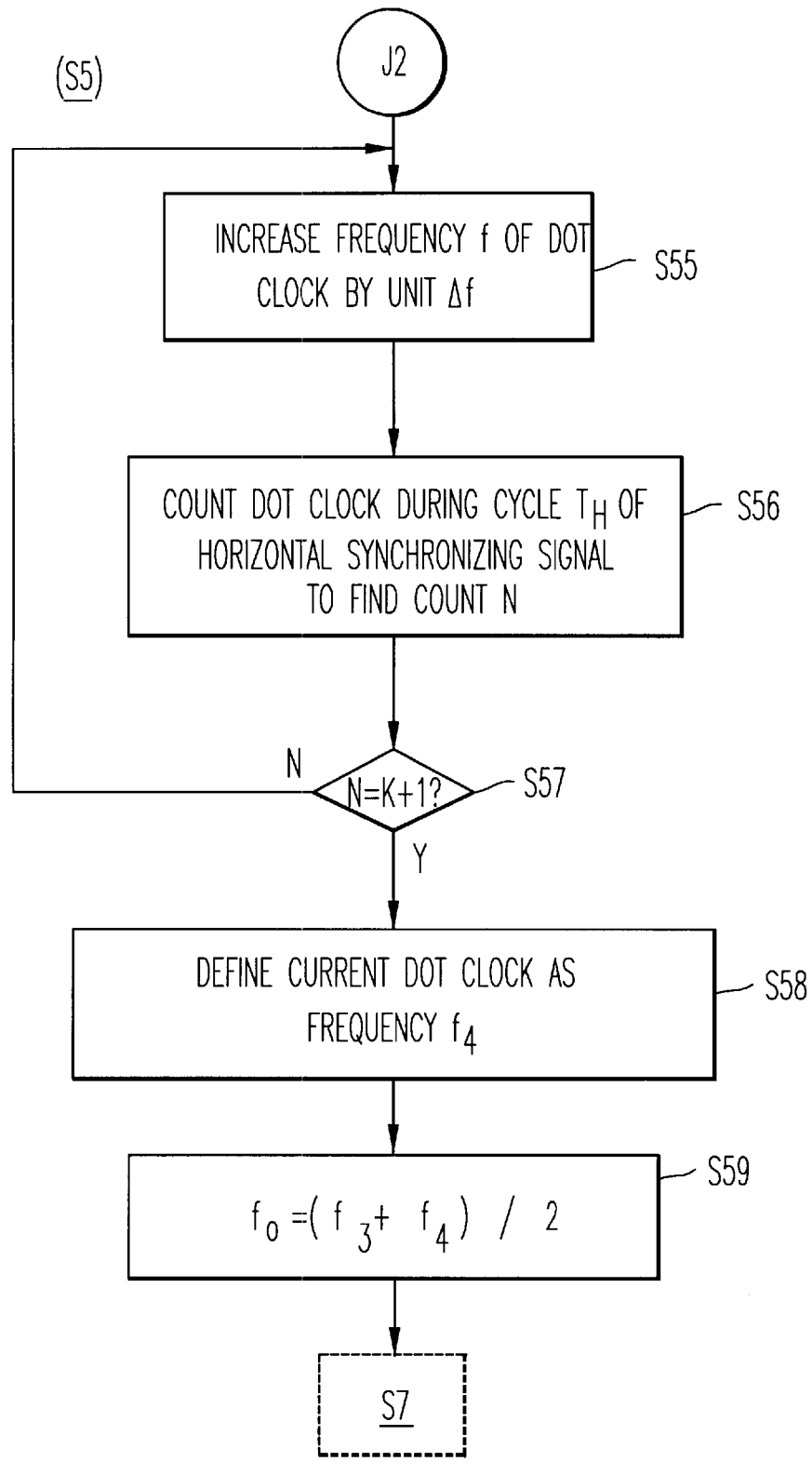
FIG. 7 is a flow chart which shows, as it is combined with FIG. 6, the detail s of a portion of the flow chart shown in FIG. 2.

To increase the accuracy of the frequency $f_0$, it is desirable that the unit Δf is as small as possible. (b) Second Processing:

FIGS. 6 and 7 are flow charts which show, as they are combined together, the details of Step S5 of FIG. 1. The two flow charts are successive to each other at J2

First, as shown in FIG. 6, the frequency f of the dot clock D is increased by the unit Δf at Step S51.

Next, at Step S52, the count N is found. Since the frequency f of the dot clock D is increased, the count N will become equal to the predetermined number K in a due course. Until the count N becomes equal to the predetermined number K the sequence returns to Step S51 through Step S53 to continue increasing of the frequency f.

If it is judged that the count N is equal to the predetermined number K at Step S53, the sequence proceeds to Step S54 to define the frequency of the dot clock D as it is immediately before the current frequency of the dot clock D as a third frequency $f_3$.

TABLE 2

| Count Number N | Frequency f |
|---|---|
| . | . |
| . | . |
| . | . |
| 799 | $f_d$ |
| 799 | $f_d + \Delta f$ |
| 799 | $f_d + 2\Delta f$ |
| 799 | $f_d + 2\Delta f = f_3$ |
| 800 | $f_d + 4\Delta f$ |
| . | . |
| . | . |
| . | . |
| 800 | $f_d + n\Delta f$ |
| 800 | $f_d + (n + 1)\Delta f$ |
| 800 | $f_d + (n + 2)\Delta f$ |
| 801 | $f_d + (n + 3)\Delta f = f_4$ |
| 801 | $f_d + (n + 4)\Delta f$ |
| 801 | $f_d + (n + 5)\Delta f$ |
| . | . |
| . | . |
| . | . |

Table 2 shows how the count N corresponds to the frequency f, during the second processing from Step S2 through Step S5. First, if the count N of the dot clock D having a frequency $f_d$ is 799, the sequence proceeds to Step S51 via Step S3 so that the frequency f of the dot clock D is $f_d+\Delta f$. Next, the sequence proceeds to Step S52. If the count N is still 799, the sequence returns to Step S51 through Step S53 so that the frequency f is $f_d+2\Delta f$.

Step S51 for increasing the frequency f is repeated in this manner. When the count N becomes 800 for the first time at Step S52 with the frequency f satisfying $f_d+4\Delta f$, the sequence proceeds to Step S54 via Step S53. Instead of the current frequency $f_d+4\Delta f$ of the dot clock D, the immediately precedent frequency $f_d+3\Delta f$ is set as the third frequency $f_3$.

As can be understood from the above, the third frequency $f_3$ which is obtained at Step S54 is the largest one so that the count N is 799 which is smaller than the predetermined number only by 1.

Next, as shown in FIG. 7, the frequency f of the dot clock D is increased by the unit $\Delta f$ at Step S55, as at Step S51. Following this, at Step S56, the count N is found as at Step S52. Since the frequency f of the dot clock D is further increased from the state where the count N became equal to the predetermined number K at Step S53, the count N will become larger than the predetermined number K by 1 in a due course. Until the count N becomes larger than the predetermined number K by 1, the sequence returns to Step S55 through Step S57 to continue increasing of the frequency f.

If it is judged that the count N is larger than the predetermined number K by 1 at Step S57, the sequence proceeds to Step S58 to set the current frequency of the dot clock D as a fourth frequency $f_4$.

The operation from Step S55 to Step S58 will be described with reference to Table 2. The frequency f of the dot clock D is increased at Step S55. If the count N is still 800 at Step S56, the sequence returns to Step 555 through Step S57 to further increase the frequency f. Step S55 is repeated in this manner. When the count N becomes 801 for the first time at Step S56 with the frequency f satisfying $f_d+(n+3)\Delta f$, the sequence proceeds to Step S58 via Step S57 to set the current frequency $f_d+(n+3)\Delta f$ of the dot clock D as the fourth frequency $f_4$.

As can be understood from the above, the fourth frequency $f_4$ which is obtained at Step S58 is the smallest one so that the count N is 801 which exceeds the predetermined number only by 1.

At Step S59, the frequency $f_o$ which is calculated by $(f_3+f_4)/2$ is set, and the sequence proceeds to Step S57 of FIG. 2. The frequency $f_0$ which is set in this manner is around the center among frequencies at which the count N becomes 800.

Thus, when the count N is smaller than the predetermined number K, using the dot clock D which has the frequency $f_0$ which is optimum for sampling, optimum sampling of the color signal is performed. (c) Third Processing:

It seems unnecessary to control the frequency f when the count N is equal to the predetermined number K at Step S3. However, in this case as well, it is desirable to control the frequency f.

As described earlier, the frequency f is controlled every unit $\Delta f$ by the programmable clock generator 2. Further, the unit $\Delta f$ is set sufficiently smaller than $1/T_H$. Hence, even when the same count N is obtained, the frequencies vary.

Figure 8:
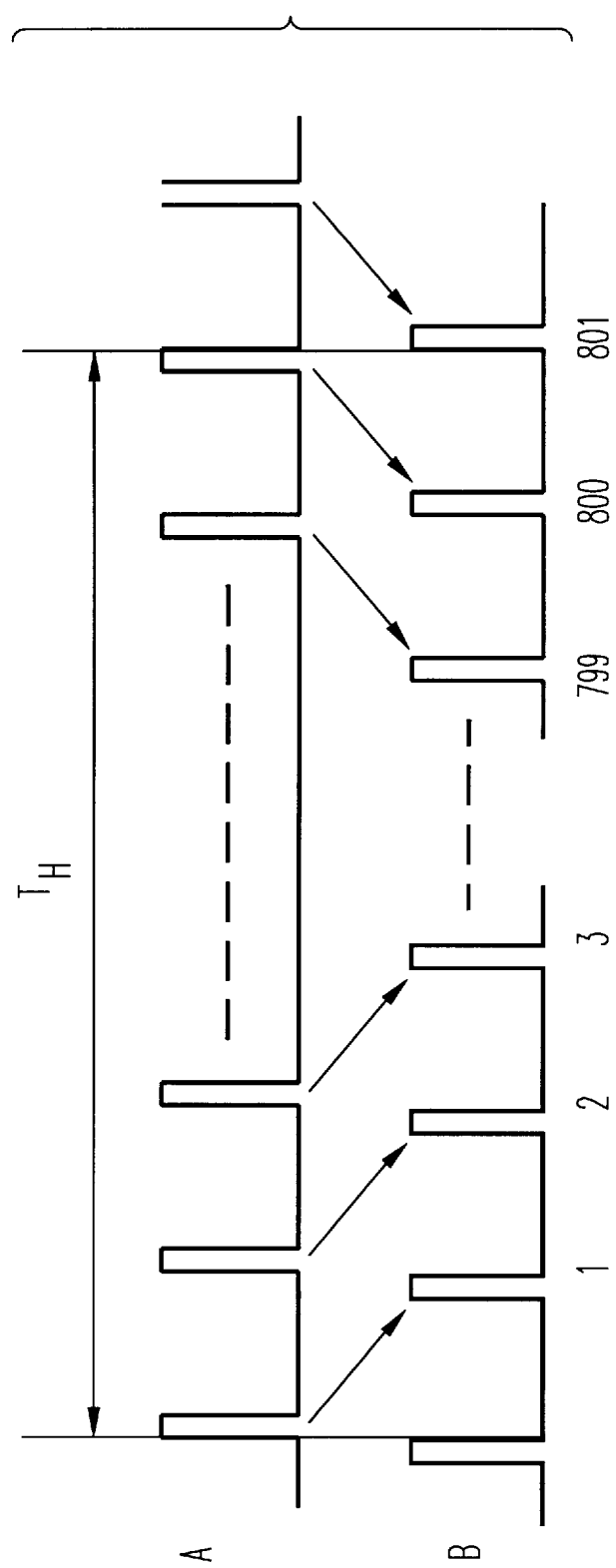
FIG. 8 is a waveform diagram showing the operation according to the preferred embodiment of the present invention.

FIG. 8 is a waveform diagram showing an extreme case of this. In the pattern (A), the activation of the dot clock D which is counted first during the cycle $T_H$ approximately coincides with the start of the cycle $T_H$. The activation of the dot clock D which is counted last during the cycle $T_H$ approximately coincides with the end of the cycle $T_H$.

On the other hand, in the pattern (B), activation of the dot clock D completes immediately before the start of the cycle $T_H$, and activation of the dot clock D starts immediately after the end of the cycle $T_H$.

Hence, even if the number of activations of the dot clock D during the cycle $T_H$ is the same (e.g., N=800) between the pattern (A) and the pattern (B), the frequency is the smallest in the pattern (A) while the frequency is the largest in the pattern (B). A difference between the two cases is about $2/T_H$.

The third processing executed at Step S6 is to reduce the difference $2/T_H$. By a similar method as in the first processing and the second processing, the frequency $f_0$ which is optimum for sampling is obtained.

Figure 9:
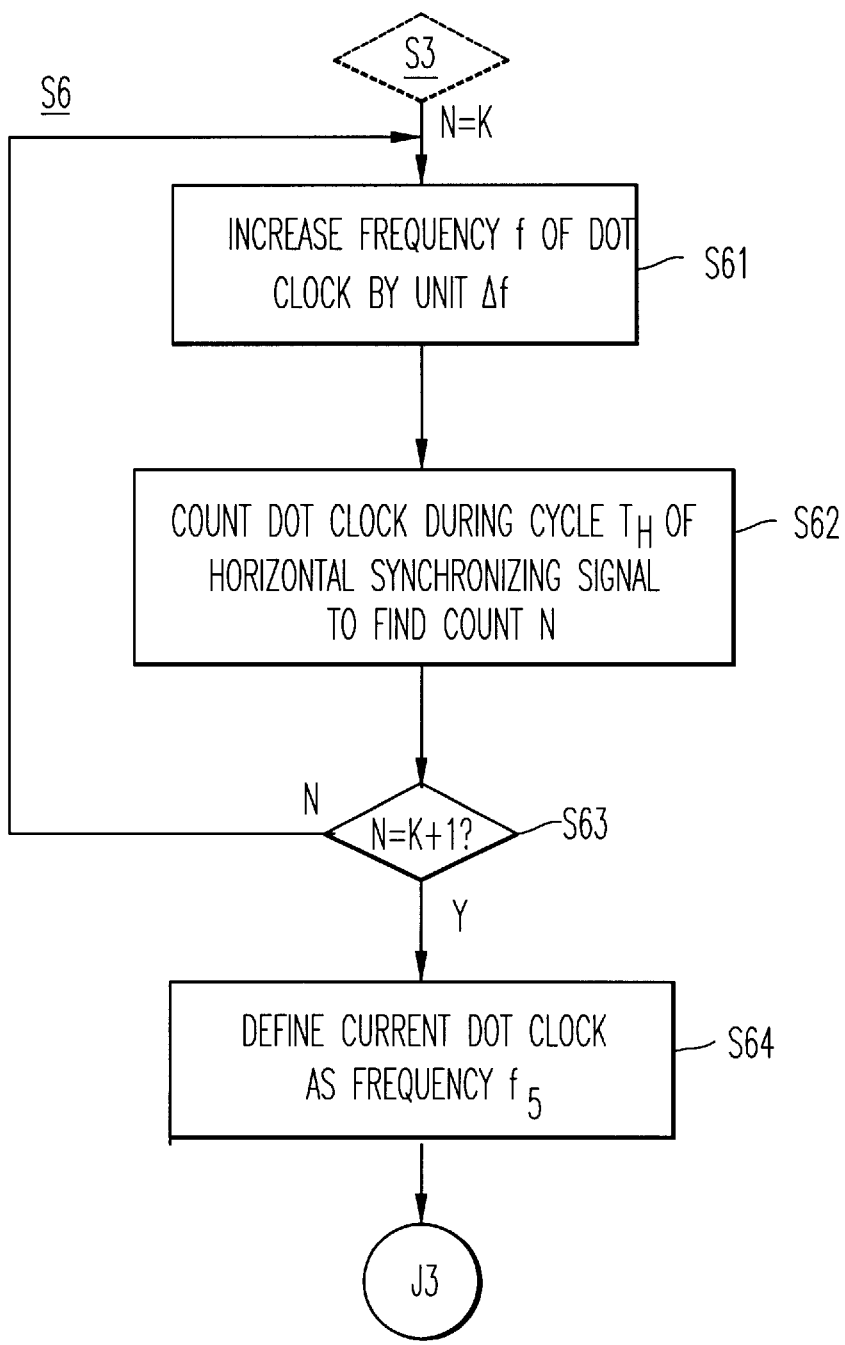
FIG. 9 is a flow chart which shows, as it is combined with FIG. 10, the details of a portion of the flow chart shown in FIG. 2.
Figure 10:
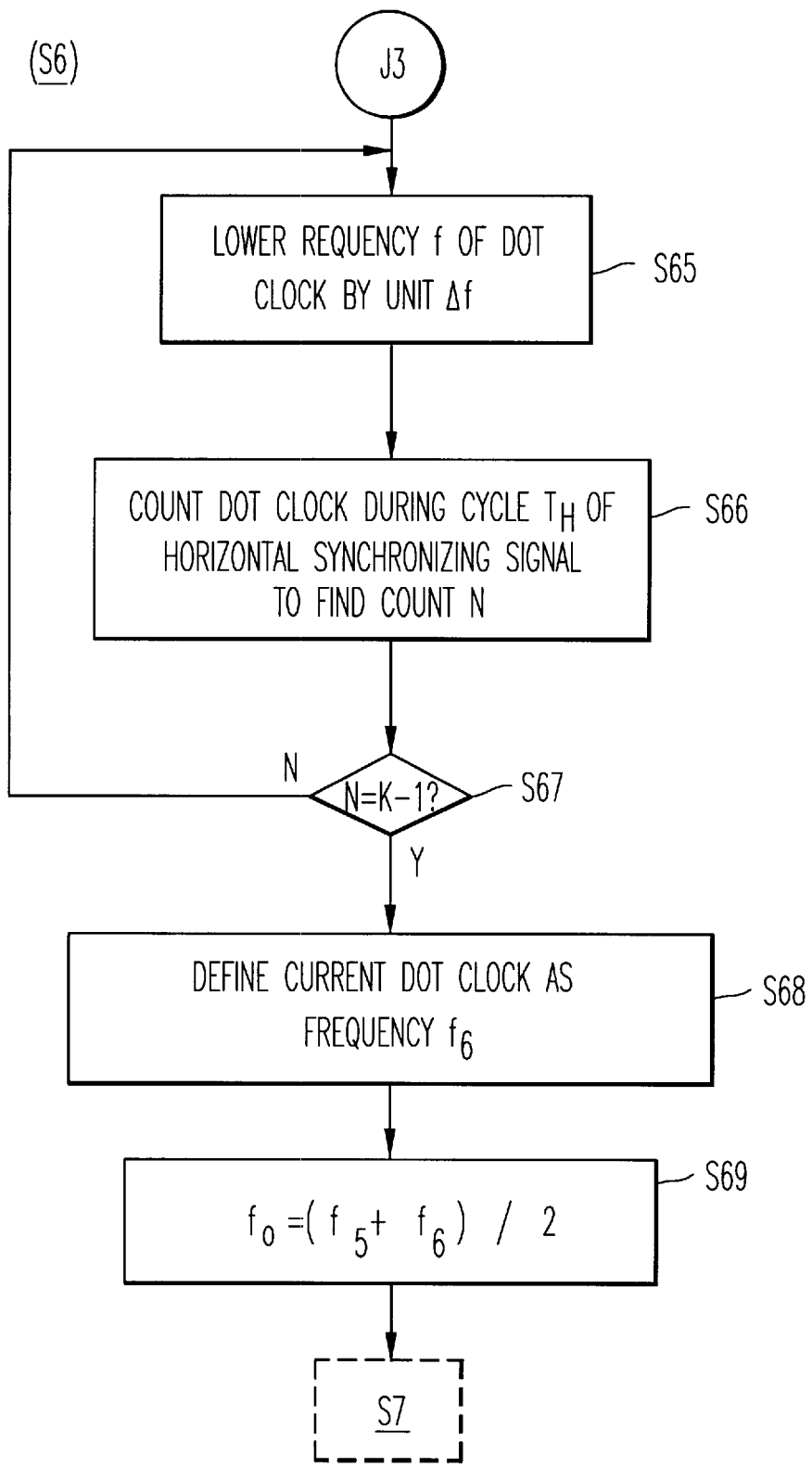
FIG. 10 is a flow chart which shows, as it is combined with FIG. 9, the details of a portion of the flow chart shown in FIG. 2.

FIGS. 9 and 10 are flow charts which show, as they are combined together, the details of Step S6 of FIG. 1. The two flow charts are successive to each other at J3.

First, as shown in FIG. 9, the frequency f of the dot clock D is increased by the unit $\Delta f$ at Step S61.

Next, at Step S62, the count N is found. Since the frequency f of the dot clock D is increased, the count N becomes larger than the predetermined number K by 1. Until the count N becomes larger than the predetermined number K by 1, the sequence returns to Step S61 through Step S63 to keep increasing the frequency f.

If it is judged that the count N is larger than the predetermined number K by 1 at Step S63, the sequence proceeds to Step S64 to set the current frequency of the dot clock D as a fifth frequency $f_5$.

TABLE 3

| Count Number N | Frequency 1 |
|---|---|
| . | . |
| . | . |
| . | . |
| 799 | $f_p - 6\Delta f$ |
| 799 | $f_p - 5\Delta f$ |
| 799 | $f_p - 4\Delta f = f_6$ |
| 800 | $f_p - 3\Delta f$ |
| 800 | $f_p - 2\Delta f$ |
| 800 | $f_p - \Delta f$ |
| 800 | $f_p$ |
| 800 | $f_p + \Delta f$ |
| 801 | $f_p + 2\Delta f = f_5$ |
| 801 | $f_p + 3\Delta f$ |
| 801 | $f_p + 4\Delta f$ |
| . | . |
| . | . |
| . | . |

Table 3 shows how the count N corresponds to the frequency f, during the third processing from Step S2 through Step S6. First, if the count N of the dot clock D having a frequency $f_p$ is 800, the sequence proceeds to Step S61 via Step S3 so that the frequency f of the dot clock D is $f_p + \Delta f$. However, since the count N is still 800 at Step S62, the sequence returns to Step S61 through Step S63.

The frequency f of the dot clock D becomes $f_p + 2\Delta f$, and the count N becomes 801 for the first time at Step S62. Hence, the sequence proceeds to Step S64 via Step S63 to define the current frequency $f_p + 2\Delta f$ of the dot clock D as the fifth frequency $f_5$.

As can be understood from the above, the fifth frequency $f_5$ which is obtained at Step S64 is the largest one so that the count N is 801 which exceeds the predetermined number only by 1.

Next, as shown in FIG. 10, the frequency f of the dot clock D is lowered by the unit $\Delta f$ at Step S65. Next, at Step S66, the count N is found as at Step S62. Since the frequency f of the dot clock D is further lowered from the state where the count N was judged to be larger than the predetermined number K by 1 at Step S63, the count N will become smaller than the predetermined number K by 1 in a due course. Until the count N becomes smaller than the predetermined number K by 1, the sequence returns to Step S65 through Step S67 to continue lowering of the frequency f.

Step S65 is repeated in this manner. When the count N becomes 799 for the first time at Step S66 with the frequency f satisfying $f_p - 4\Delta f$, the sequence proceeds to Step S68 via Step S67 to define the current frequency $f_p - 4\Delta f$ as a sixth frequency $f_6$.

As can be understood from the above, the sixth frequency $f_6$ which is obtained at Step S68 is the largest one so that the count N is 799 which is smaller than the predetermined number only by 1.

The frequency $f_0$ which is calculated by $(f_5+f_6)/2$ is set at Step S69, and the sequence proceeds to Step S7 of FIG. 2. The frequency $f_0$ which is set in this manner is around the center among frequencies at which the count N becomes 800.

Thus, in the case where the count N is equal to the predetermined number K as well, using the dot clock D which has the frequency $f_0$ which is optimum for sampling, optimum sampling of the color signal is performed.

In the third processing described above, the minimum fifth frequency $f_5$ at which the count N is larger than the predetermined number K by 1 is found, first. Thereafter, the minimum fifth frequency $f_5$ at which the count N is smaller than the predetermined number K by 1 is found. Still, it is clear that the same effect is obtained even if the order of finding these minimum fifth frequencies is reversed.

While the invention has been described in detail, the foregoing description is in all aspects illustrative and not restrictive. It is understood that numerous other modifications and variations can be devised without departing from the scope of the invention.

We claim:

1. A color signal sampling method for sampling a color signal of an analog form, using a sampling clock having a frequency f, said color signal sampling method comprising the steps of:

(a) inputting a horizontal synchronizing signal which is activated during a predetermined cycle $T_H$ and inputting said color signal;

(b) counting the number N of activations of said sampling clock per said cycle $T_H$;

(c) comparing said number N of activations with a predetermined number K;

(d) setting said frequency f to a specific frequency by performing:

(d-1) first processing for decreasing said frequency f when N>K, and (d-2) second processing for increasing said frequency f when N<K;

(d-3) third processing for first increasing said frequency f and then decreasing said frequency f when N=K; and (e) sampling said color signal using said sampling clock at said specific frequency.

2. The color signal sampling method of claim 1, wherein said frequency f is controlled in a unit which is finer $1/T_H$, and said first processing includes the steps of:

(d-1-1) decreasing said frequency f by said unit and setting said frequency f immediately before N=K as a first frequency;

(d-1-2) decreasing said frequency f by said unit and setting said frequency f which sets N=K for first time as a second frequency; and (d-1-3) calculating said specific frequency by dividing a sum of said first and second frequencies by 2.

3. The color signal sampling method of claim 2, wherein said second processing includes the steps of:

(d-2-1) increasing said frequency f by said unit and setting said frequency f as it is immediately before N=K as a third frequency;

(d-2-2) increasing said frequency f by said unit and setting said frequency f which sets N=K+1 for first time as a fourth frequency; and (d-2-3) calculating said specific frequency by dividing a sum of said third and fourth frequencies by 2.

4. The color signal sampling method of claim 3, wherein said frequency f is controlled in a unit which is finer than $1/T_H$ and said third processing step (d-3) when N=K including the steps of:

(d-3-1) increasing said frequency f by said unit and setting said frequency f which sets N=K+1 for first time as a fifth frequency, (d-3-2) decreasing said frequency f by said unit and setting said frequency f which sets N=K-1 for first time as a sixth frequency, and (d-3-3) calculating said specific frequency by dividing a sum of said fifth and sixth frequencies by 2.

5. A color signal sampling method for sampling a color signal of an analog form, using a sampling clock having a frequency f, said color signal sampling method comprising the steps of:
(a) inputting a horizontal synchronizing signal which is activated during a predetermined cycle $T_H$ and inputting said color signal;
(b) counting the number N of activations of said sampling clock per said cycle $T_H$;
(c) comparing said number N of activations with a predetermined number K;
(d) setting said frequency f to a specific frequency; and
(e) sampling said color signal using said sampling clock at said specific frequency;
wherein said frequency f is controlled in a unit which is finer than $1/T_H$; and
said step (d) includes the steps of:
when N=K,
(d-1) increasing said frequency f by said unit and setting said frequency f which sets N=K+1 for a first time as a first frequency,
(d-2) decreasing said frequency f by said unit and setting said frequency f which sets N=K+1 for a first time as a second frequency, and
(d-3) calculating said specific frequency by dividing a sum of said first and second frequencies by 2.

6. A color signal sampling method for sampling a color signal of an analog form, using a sampling clock having a frequency f, said color signal sampling method comprising the steps of:
(a) inputting a horizontal synchronizing signal which is activated during a predetermined cycle $T_H$ and inputting said color signal;
(b) counting the number N of activations of said sampling clock per said cycle $T_H$;
(c) comparing said number N of activations with a predetermined number K;
(d) setting said frequency f to a specific frequency by performing a processing for decreasing said frequency f when N>K; and
(e) sampling said color signal using said sampling clock at said specific frequency;
wherein said frequency f is controlled in a unit which is finer than $1/T_H$; and said processing step includes the steps of:
(d-1) decreasing said frequency f by said unit and setting said frequency f to a frequency immediately before N=K as a first frequency,
(d-2) decreasing said frequency f by said unit and setting said frequency f which sets N=K−1 for a first time as a second frequency, and
(d-3) calculating said specific frequency by dividing a sum of said first and second frequencies by 2.

7. A color signal sampling method for sampling a color signal of an analog form, using a sampling clock having a frequency f, said color signal sampling method comprising the steps of:
(a) inputting a horizontal synchronizing signal which is activated during a predetermined cycle $T_H$ and inputting said color signal;
(b) counting the number N of activations of said sampling clock per said cycle $T_H$;
(c) comparing said number N of activations with a predetermined number K;
(d) setting said frequency f to a specific frequency by performing a processing for increasing said frequency f when N<K; and
(e) sampling said color signal using said sampling clock at said specific frequency;
wherein said frequency f is controlled in a unit which is finer than $1/T_H$; and said processing step includes the steps of:
(d-1) increasing said frequency f by said unit and setting said frequency f to a frequency immediately before N=K as a first frequency,
(d-2) increasing said frequency f by said unit and setting said frequency f which sets N=K+1 for a first time as a second frequency, and
(d-3) calculating said specific frequency by dividing a sum of said first: and second frequencies by 2.

* * * * *